(12) United States Patent
Uduki (10) Patent No.: US 8,035,677 B2
(45) Date of Patent: Oct. 11, 2011

(54) OPTICAL SCANNING APPARATUS

(75) Inventor: Kazuo Uduki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 465 days.

(21) Appl. No.: 12/390,019

(22) Filed: Feb. 20, 2009

(65) Prior Publication Data
US 2009/0214259 A1 Aug. 27, 2009

(30) Foreign Application Priority Data
Feb. 22, 2008 (JP) .................. 2008-041456

(51) Int. Cl.
*B41J 15/14* (2006.01)
*B41J 27/00* (2006.01)
*B41J 2/435* (2006.01)

(52) U.S. Cl. ......................... 347/242; 347/263

(58) Field of Classification Search .................. 347/242, 347/245, 263
See application file for complete search history.

(56) References Cited

U.S. PATENT DOCUMENTS

| | | | | |
|---|---|---|---|---|
| 5,299,051 A * | 3/1994 | Hirano | ......................... | 359/216.1 |
| 5,901,000 A * | 5/1999 | Fish et al. | ...................... | 359/896 |
| 6,339,491 B1 * | 1/2002 | Kondou et al. | ............ | 359/212.1 |
| 7,072,087 B2 * | 7/2006 | Nakahata | ................... | 359/204.1 |
| 7,271,941 B2 * | 9/2007 | Hudson et al. | ............. | 359/204.1 |
| 2006/0139440 A1 * | 6/2006 | Tomita | ......................... | 347/225 |
| 2006/0187513 A1 * | 8/2006 | Ohsugi | ......................... | 359/212 |
| 2007/0159674 A1 * | 7/2007 | Tomita | ......................... | 359/201 |
| 2007/0165099 A1 * | 7/2007 | Yoshizawa et al. | ........... | 347/245 |

FOREIGN PATENT DOCUMENTS

| JP | 2002-350768 A | 12/2002 |
|---|---|---|
| JP | 2006-078903 A | 3/2006 |
| JP | 2007-79515 | 3/2007 |

OTHER PUBLICATIONS

Partial english translation of JP 2007-79515, dated Mar. 2007.

* cited by examiner

*Primary Examiner* — Laura Martin
*Assistant Examiner* — Jeremy Bishop
(74) *Attorney, Agent, or Firm* — Fitzpatrick, Cella, Harper & Scinto (57) ABSTRACT

In an optical scanning apparatus, when air flow from a deflecting device is suppressed by a shielding member such as a transparent member, an image of a light beam is not formed at a predetermined position. In view of this, a first wall portion having a wall surface shaped concentrically with a center axis of a deflecting device is provided on an optical path directed from a laser light source toward the deflecting device. By providing at least the first wall portion having laser beam passing portions as openings passing through the wall surface of the first wall portion and providing a second wall portion connected to the first wall portion to define a closed surface except for the laser beam passing portions, warm air flow directed from the deflecting device to the laser light source is blocked.

5 Claims, 12 Drawing Sheets

OPTICAL SCANNING APPARATUS

FIELD OF THE INVENTION AND RELATED ART

The present invention relates to an optical scanning apparatus.

In the optical scanning apparatus used for an electrophotographic image forming apparatus, light beam emitted from the light source is subjected to optical modulation depending on an image signal. Then, the light beam subjected to optical modulation is periodically deflected by a polygonal mirror as rotating deflecting element. The deflected light beam converges in a spot-like shape on a surface of an electrophotographic photosensitive member as an image bearing member having photosensitivity (hereinafter referred to as a "photosensitive drum") by a reflection mirror for reflecting the light beam in a predetermined direction and an imaging optical lens having an fθ characteristic. The spot on the imaging plane (surface) is moved by scanning in a rotational axis direction (main scan direction) of the photosensitive drum by rotation of the polygonal mirror. Further, by the rotation of the photosensitive drum, an electrostatic latent image is formed with respect to a rotational direction (sub-scan direction).

The optical scanning apparatus includes, as heat generation sources, a deflecting element for deflecting the light beam by rotation and a deflecting device with a motor for driving the deflecting element. That is, when the motor of the deflecting device starts rotation from a rest state, the motor and a motor control circuit P (a circuit board including an integrated circuit (IC) and the like) generate heat to increase a temperature in the neighborhood of a mounting portion of the deflecting device to an optical system casing through heat conduction or heat radiation.

In such an optical scanning apparatus, when deformation attributable to a change in temperature of the optical system casing occurs, attitudes of optical elements such as mirrors and lenses provided at predetermined positions in the optical system casing are changed to cause deviation in irradiation position of scanning line (beam). Particularly, in a color image forming apparatus, the deviation in irradiation position of scanning line appears on an image as color misregistration such that scanning lines to be originally superposed with each other are not superposed. The type of this color misregistration can be roughly classified into parallel misregistration, oblique misregistration, and quadric curve-like misregistration.

For that reason, a performance required for the optical system casing is such that an amount of deformation is not large even when an ambient temperature fluctuates and that even when the deformation occurs, the deformation is not irregular deformation such as torsional deformation. Further, by rotation of the deflecting element, the air heated in the neighborhood of the deflecting device moves as air flow (stream) from the deflecting element within the optical system casing, thus heating a particular portion. As a method of blocking the air flow from the deflecting device, various methods have been proposed.

Generally, in a period from power-on of the image forming apparatus until image formation is continued and its state reaches a thermal equilibrium state, due to self-heat-generation of the deflecting device, a temperature of an inner portion of the optical system casing is increased by about 5° C. to 10° C. By this temperature increase, distortion of the optical system casing itself, deformation of a supporting portion for supporting a lens and a mirror, deformation of the lens itself and the mirror itself, and the like occur. By these deformations, an imaging position of the light beam on the photosensitive drum is deviated, so that a quality of an image is lowered.

Japanese Laid-Open Application (JP-A)2007-079515 proposes an optical scanning apparatus such that double standing walls are provided between a polygonal mirror as the deflecting element and a lens closest to the polygonal mirror. These double standing walls are provided with openings through which laser light passes. These openings permit passing of the air. The double standing walls have a function of suppressing blowing hot air from portions other than the openings on the lens. By the double standing walls, deformation of the lens due to temperature rise can be suppressed, so that it is possible to suppress a deviation of an imaging position of a light beam attributable to deformation of the lens.

However, the air moving from a deflecting element toward a light source passes through the openings not a little. The air having passed through the openings gets hot, thus heating the light source and a member for supporting the light source. As a result, the light source and the member for supporting the light source are deformed. For that reason, such a phenomenon that an imaging position of the light beam was deviated occurred, so that a quality of an image was lowered. Particularly, in a tandem type color image forming apparatus, the lowering in image quality was caused to occur conspicuously because of an occurrence of the color misregistration such that scanning lines to be originally superposed with each other are not superposed by deformation of the lens, the light source and members for supporting the lens and the light source.

SUMMARY OF THE INVENTION

The present invention has solved the above-described problem of a conventional optical scanning apparatus. A principal object of the present invention is to provide an optical scanning apparatus capable of suppressing passing of air flow generated by rotational of a polygonal mirror through a light beam passing opening provided to a wall between the polygonal mirror and a light source.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiment 1

(1) Image Forming Apparatus

Figure 1:
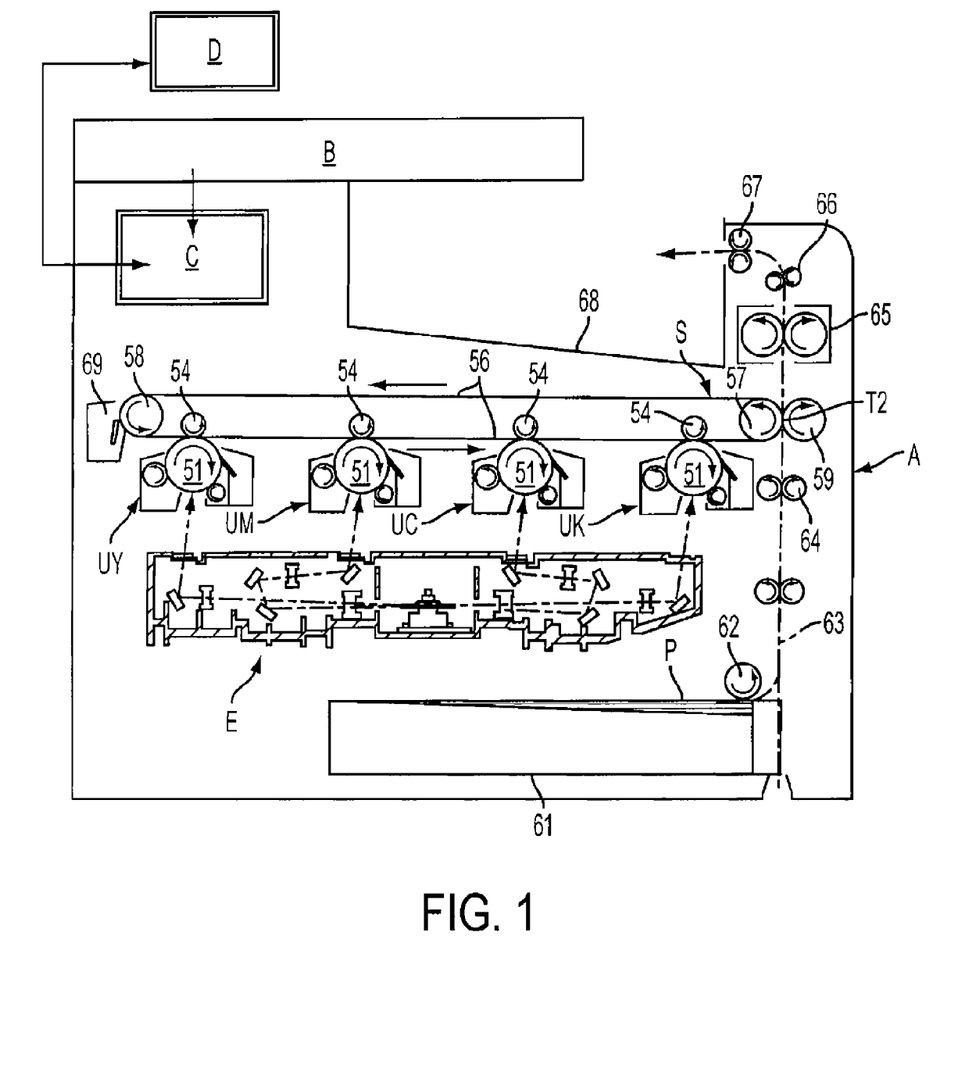
FIG. 1 is a schematic view of an image forming apparatus in Embodiment 1.
Figure 2:
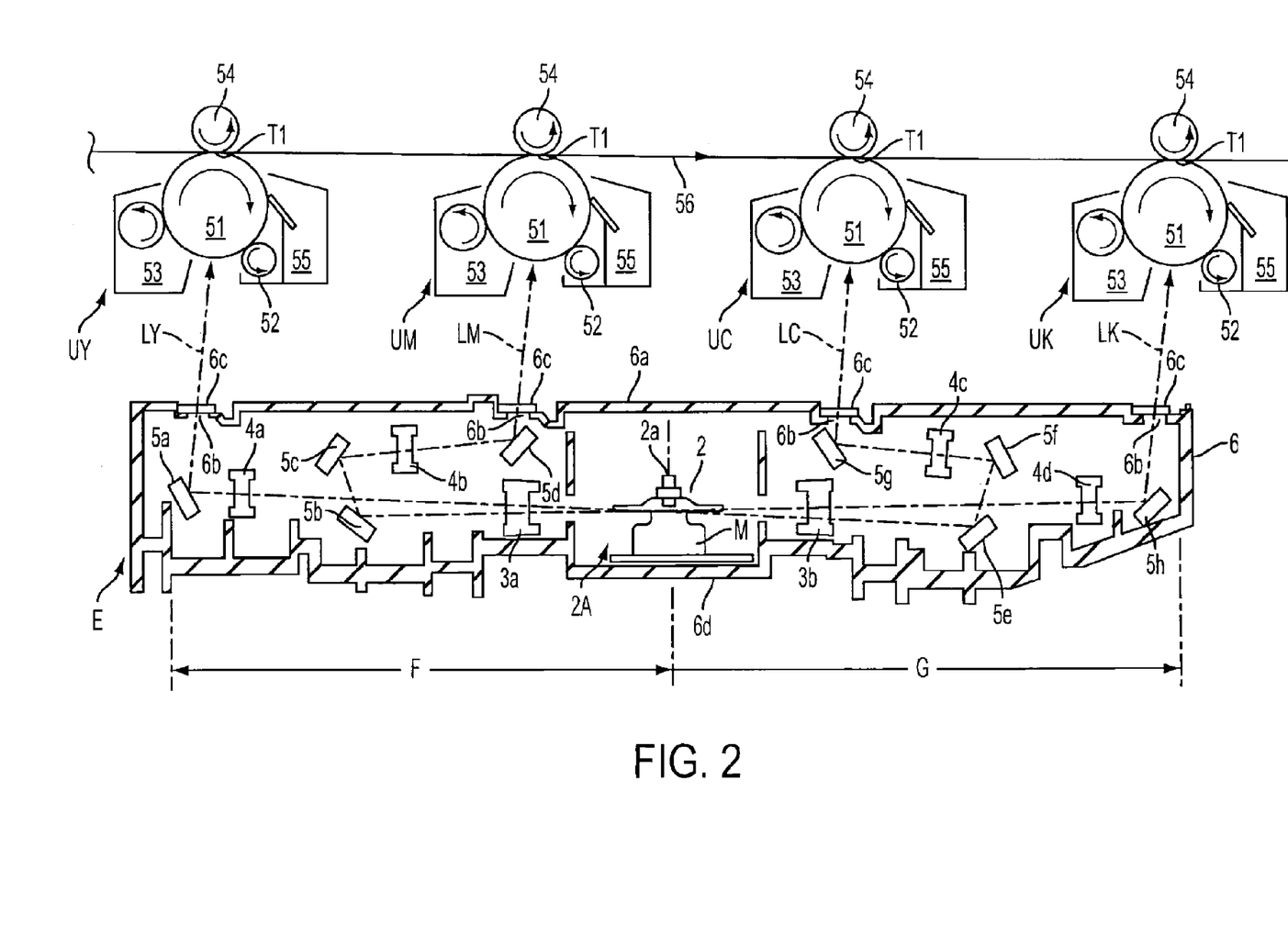
FIG. 2 is a partially enlarged view of FIG. 1.

FIG. 1 is a schematic view showing an embodiment of an image forming apparatus in which an optical scanning apparatus (scanning optical apparatus) according to the present invention is mounted. FIG. 2 is a partially enlarged view of FIG. 1.

This image forming apparatus is tandem-type color image forming apparatus using electrophotography, a laser beam scanning exposure method, and an intermediary transfer belt method and is also a multi-function machine used as a copying machine, a printer, and a facsimile machine. Incidentally, in this embodiment, the color image forming apparatus is described as an example but the present invention is applicable to not only the color image forming apparatus but also a monochromatic image forming apparatus.

The image forming apparatus includes a printer station A and a reader station B mounted on the printer station A.

In the case of a copying machine mode, a photoelectric reading image signal (image information) of an original image is inputted from the reader station B into an image signal processing portion of a control circuit portion C. The image signal processing portion prepares digital image signals obtained by color-converting (separating) the inputted image signal into component image signals of yellow, magenta, cyan and black. Based on these image signals, the printer station A operates as the copying machine.

In the case of a printer mode, an image signal inputted from a personal computer or the like as an external device D into the image signal processing portion of the control circuit portion C is subjected to image processing and thus the printer station A operates as the printer.

In the case of a facsimile receiving mode, an image signal inputted from a remote facsimile machine as the external device D into the image signal processing portion of the control circuit portion C is subjected to image processing and thus the printer portion A operates as a facsimile receiving machine.

In the case of a facsimile sending (transmitting) mode, an original image signal photoelectrically read by the reader station B is inputted into the control circuit portion C and is sent to the remote facsimile machine as the external device D. Thus, the image forming apparatus operates as a facsimile sending machine.

The control circuit portion C is a control means (controller) for subjecting the image forming apparatus to centralized control in accordance with a predetermined program.

The printer station includes, as shown in FIG. 1, a plurality of image forming portions (stations) horizontally disposed in parallel to each other with a predetermined interval. In this embodiment, the image forming portions are first to fourth (four) image forming stations UY for forming a yellow (Y) tone image, UM for forming a magenta (M) toner image, UC for forming a cyan (C) toner image, and UK for forming a black (K) toner image, respectively.

The respective image forming stations are electrophotographic image forming mechanisms having the same constitution and at each of the image forming stations, a drum-type electrophotographic photosensitive member as an image bearing member (a member to be scanned or a recording medium) (hereinafter, referred to as a "photosensitive drum") 51 is provided. The photosensitive drum 51 is rotationally driven in a clockwise direction indicated by an arrow at a predetermined speed. Around the photosensitive drum 51, image forming process means acting on the photosensitive drum 51 are provided. In this embodiment, the image forming process means are a primary charger 52, a developing device 53, a primary transfer roller 54, and a drum cleaning device 55. In the developing devices 53 of the first to fourth image forming stations, as developer, yellow (Y) toner, magenta (M) toner, cyan (C) toner, and black (K) toner are accommodated.

Below the first to fourth image forming stations UY, UM, UC and UK, an optical scanning apparatus E as an image exposure means is provided. This optical scanning apparatus E will be described more specifically in (2) appearing hereinbelow.

At the first image forming station UY, a surface of the photosensitive drum 51 which is rotationally driven and then is electrically charged by the primary charger 52 is irradiated with laser light beam LY, emitted as scanning light from the optical scanning apparatus E, modulated correspondingly to an image signal of a Y color component image for a full-color image. Thus, an electrostatic latent image is formed by the laser light beam LY. The latent image is developed as the Y toner image by the developing device 53.

At the second image forming station UM, a surface of the photosensitive drum 51 which is rotationally driven and then is electrically charged by the primary charger 52 is irradiated with laser light beam LM, emitted as scanning light from the optical scanning apparatus E, modulated correspondingly to an image signal of a M color component image for a full-color image. Thus, an electrostatic latent image is formed by the laser light beam LM. The latent image is developed as the M toner image by the developing device 53.

At the third image forming station UC, a surface of the photosensitive drum 51 which is rotationally driven and then is electrically charged by the primary charger 52 is irradiated with laser light beam LC, emitted as scanning light from the optical scanning apparatus E, modulated correspondingly to an image signal of a C color component image for a full-color image. Thus, an electrostatic latent image is formed by the laser light beam LC. The latent image is developed as the C toner image by the developing device 53.

At the fourth image forming station UK, a surface of the photosensitive drum 51 which is rotationally driven and then is electrically charged by the primary charger 52 is irradiated with laser light beam LK, emitted as scanning light from the optical scanning apparatus E, modulated correspondingly to an image signal of a K color component image for a full-color image. Thus, an electrostatic latent image is formed by the laser light beam LK. The latent image is developed as the K toner image by the developing device 53.

On the first to fourth image forming stations UY, YM, UC and UK, an endless intermediary transfer belt 56 is disposed.

The belt 56 is stretched between belt conveying rollers 57 and 58 and is rotationally driven in a counterclockwise direction at a speed corresponding to the rotational speed of the photosensitive drum 51.

As shown in FIG. 1, with respect to a lower surface of a lower belt portion of the belt 56 moving toward a right-hand side in the figure, an upper position of the photosensitive drum 54 of each of the image forming stations faces. Each of the primary transfer rollers 65 is disposed inside the belt 56 and interposes the lower belt portion, which moves rightwardly, between it and the upper position of an associated photosensitive drum 54 in contact with each other. Contact portions between the belt 56 and the respective photosensitive drums 54 constitute primary transfer nips T1.

The belt conveying roller 57 interposes the belt 56 between it and a secondary transfer roller 59 in contact with each other. A contact portion between the belt 56 and the secondary transfer roller 59 constitutes a secondary transfer nip T2.

The control circuit portion C controls the respective image forming station UY, UM, UC and UK so as to perform an image forming operation on the basis of an image formation start signal and the color-separated component image signal for the inputted color image. As a result, at the image forming stations UY, UM, UC and UK, the color toner images of yellow, magenta, cyan and black are formed, respectively, on associated rotating photosensitive drums 51 with predetermined control timing. Electrophotographic image forming principle and process for forming the toner images on the photosensitive drums 51 are well known, thus being omitted from the description.

The above-described color toner images formed on the surfaces of the photosensitive drums 51 of the image forming stations are successively transferred onto the rotating belt 56 at the respective primary transfer nips T1 in a superposition manner. During the primary transfer, to each of the primary transfer rollers 54, a predetermined transfer bias is applied. As a result, on the surface of the belt 56, an unfixed full-color toner image is formed by the superposition of the four color toner images Y, M, C and K.

The drum cleaning device 55 of each of the image forming stations removes primary transfer residual toner remaining on the photosensitive drum 51 after the primary transfer of the toner images onto the belt 56.

The control circuit portion C drives a sheet-feeding roller 62 with predetermined sheet-feeding timing. As a result, one sheet of a recording material P is separated and fed from a sheet-feeding cassette 61 in which sheet-like recording materials (transfer paper) P are stacked and accommodated and then is conveyed to a registration roller pair 64 through a vertical conveying path 63.

At that time, rotation of the registration roller pair 64 is stopped and a leading edge of the recording material P is received by a nip of the registration roller pair 64, so that correction of oblique movement of the recording material P is carried out. Then, the registration roller pair 64 conveys the recording material P with timing so that the leading edge of the recording material P reaches the nip T2 in synchronism with arrival of a leading end of the full-color toner image formed on the rotation belt at the nip T2. As a result, at the secondary transfer nip T2, the component toner images of the full-color toner image are simultaneously secondary-transferred from the belt 56 onto the surface of the recording material P. During the secondary transfer, a predetermined transfer bias is applied to the secondary transfer roller 59.

The recording material P coming out of the secondary transfer nip T2 is separated from the surface of the belt 56 and introduced into a fixing device 65. By the fixing device 65, the above-described plurality of the color toner images is melted and mixed under heating and pressure, thus being fixed on the surface of the recording material P as a fixed image. The recording material coming out of the fixing device 65 is discharged as a full-color image formation product onto a sheet discharge tray 68 through a conveying roller pair 66 and a sheet discharging roller pair 67.

Secondary transfer residual toner remaining on the belt 56 is removed by a belt cleaning device 69 disposed outside the belt 56 so as to face the belt conveying roller 58 through the belt 56.

As a color deviation amount detecting means, a registration detection sensor (hereinafter referred to as a "registration sensor") S is provided. This registration sensor S detects an amount of color misregistration by detecting a registration correction pattern for each color formed on the belt 56 and is fed back to the control circuit portion C. The control circuit portion C corrects the color misregistration due to a top margin and a side margin, based on the detection of the amount of the color misregistration by the registration sensor S, by electrically correcting writing timing of image data. Further, also with respect to color misregistration attributable to magnification, coincidence of the magnification is realized by minutely changing an image clock frequency.

(2) Optical Scanning Apparatus E

In the following description, a main scan direction customarily refers to a longitudinal drum direction in which a scanning optical system of the optical scanning apparatus E optically scans the photosensitive drum surface as a surface to be scanned (i.e., a photosensitive drum rotational axis direction or a photosensitive drum generatrix direction) or a direction corresponding to this direction. A sub-scan direction refers to a direction perpendicular to the longitudinal drum direction (the main scan direction) or a direction corresponding to this direction. FIGS. 1 and 2 show cross-sections with respect to the sub-scan direction.

The optical scanning apparatus E is a laser scanner and includes an optical system casing (box-like casing) 6 in which various optical elements (optical members) for constituting the scanner are accommodated. The various optical elements include a laser unit, an incident-side optical system, a deflecting device as a deflection scanning means, an emission-side optical system, a synchronization detecting element for determining writing timing of light beam, and the like, as described later specifically. These various optical elements are held in the optical system casing at predetermined positions and with a predetermined arrangement by fixing means such as connection by screws, spring urging, and adhesive bonding. An upper surface of the optical system casing 6 is an open surface (an opened portion) and from the open surface, the above-described various optical elements are incorporated into the optical system casing 6. The open surface is covered with a covering member (top cover) 6a to be sealed (enclosed). The covering member 6a are provided with slit windows 6b through which the light beams LY, LM, LC and LK are emitted toward the photosensitive drums of the above-described first to fourth image forming stations, respectively. Each of the slit windows 6b is provided with a dustproof gloss member 6c.

The optical system casing 6 and the covering member 6a and formed of, e.g., a synthetic resin material such as polyphenylene ether (PPE) or polystyrene (PS) reinforced in mixture with glass fiber and are molded parts prepared by metallic molding (ejection molded parts of the glass fiber-reinforced resin material).

Figure 3:
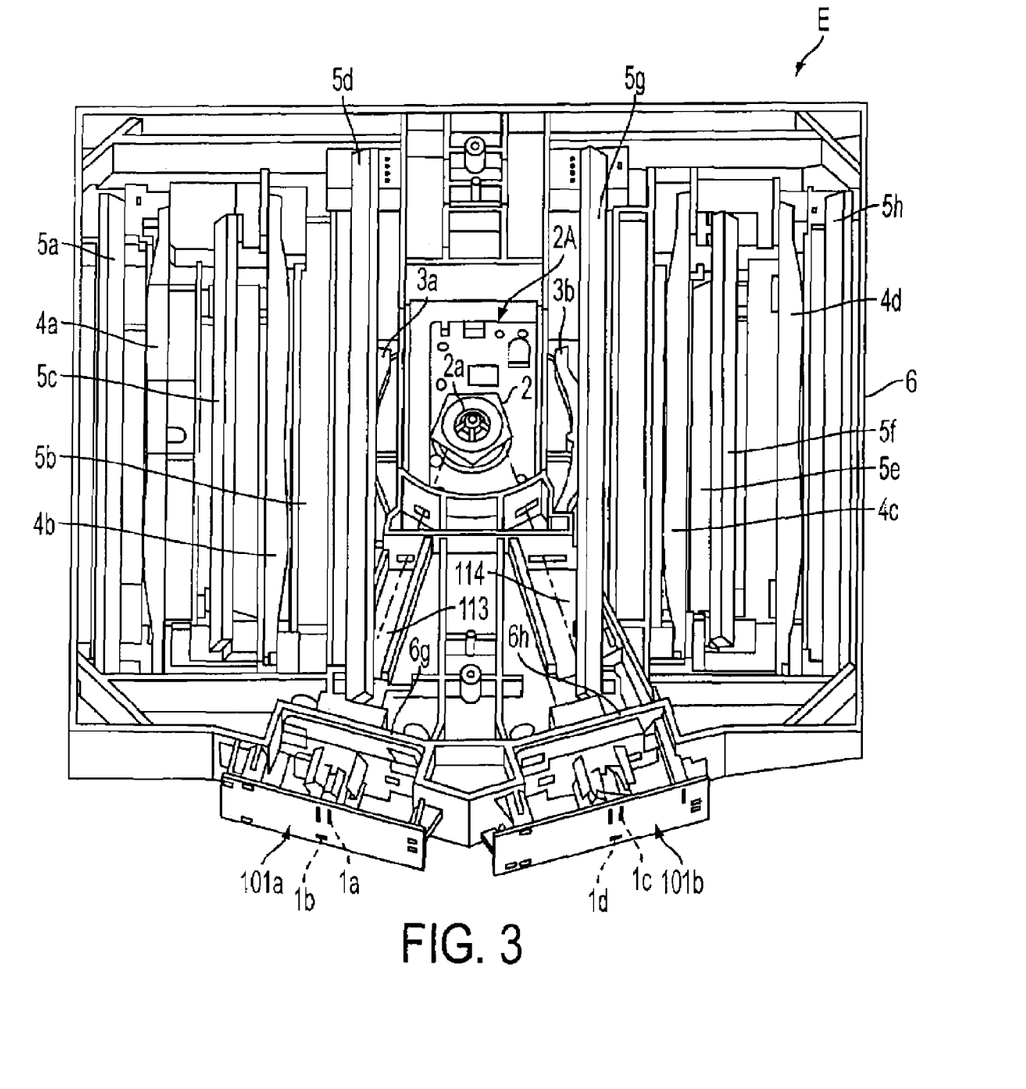
FIG. 3 is a perspective view of an optical scanning apparatus in a state in which a covering member (a top cover) is removed to show an inside of an optical system casing.
Figure 4:
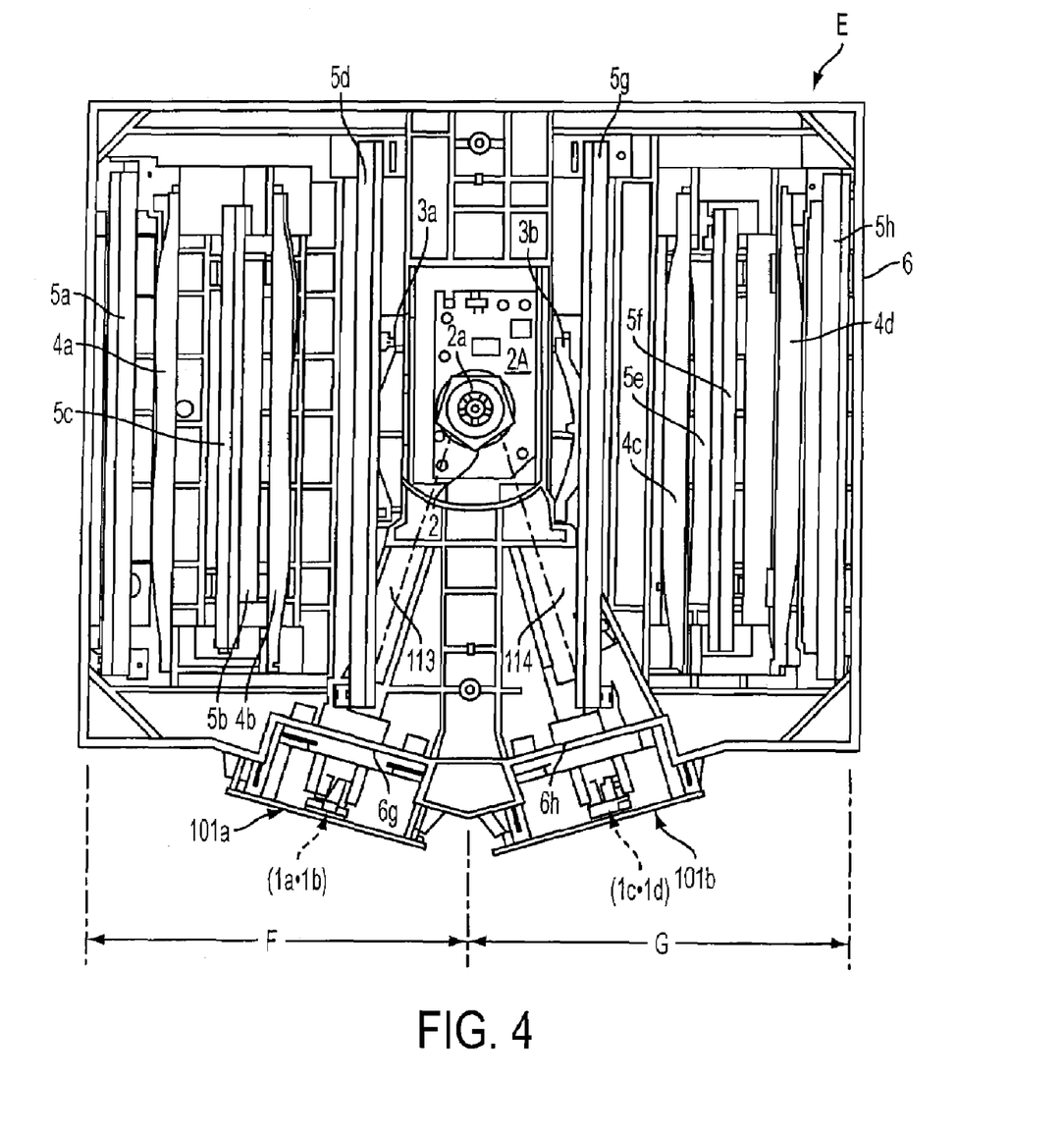
FIG. 4 is a plan view of the optical scanning apparatus in a state in which the covering member is removed to show the inside of the optical system casing.
Figure 5:
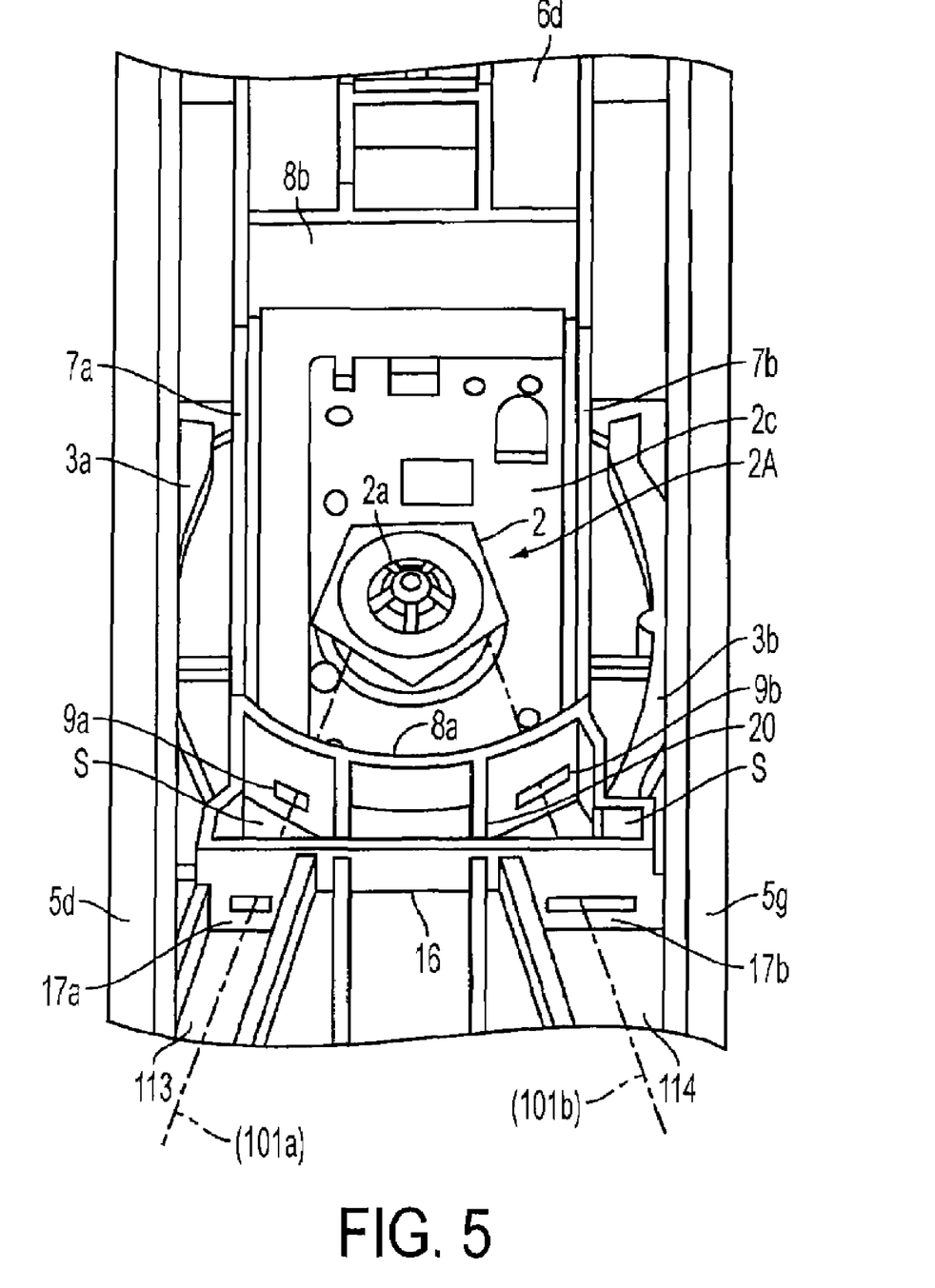
FIG. 5 is a partially enlarged view of a portion, at which a deflecting device is disposed, shown in FIG. 3.
Figure 6:
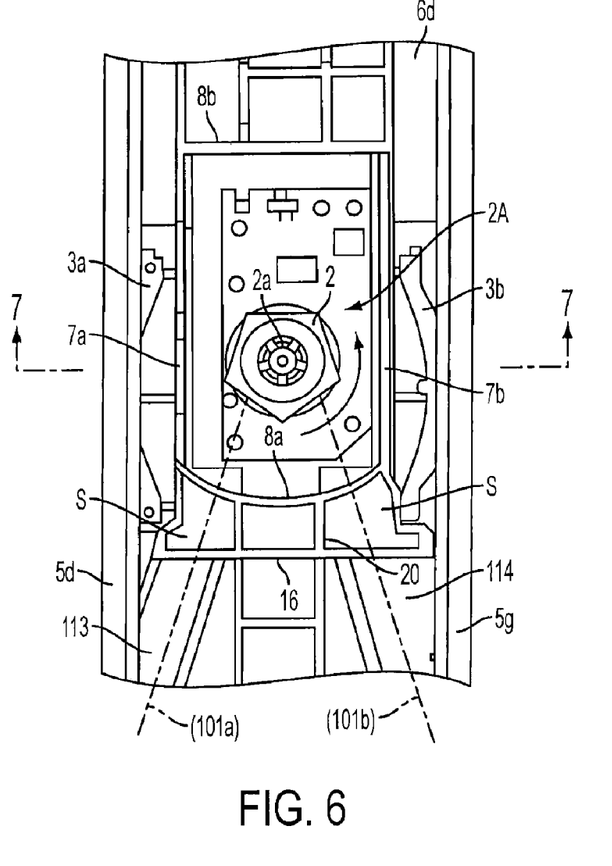
FIG. 6 is a partially enlarged view of a portion, at which a deflecting device is disposed, shown in FIG. 4.
Figure 7:
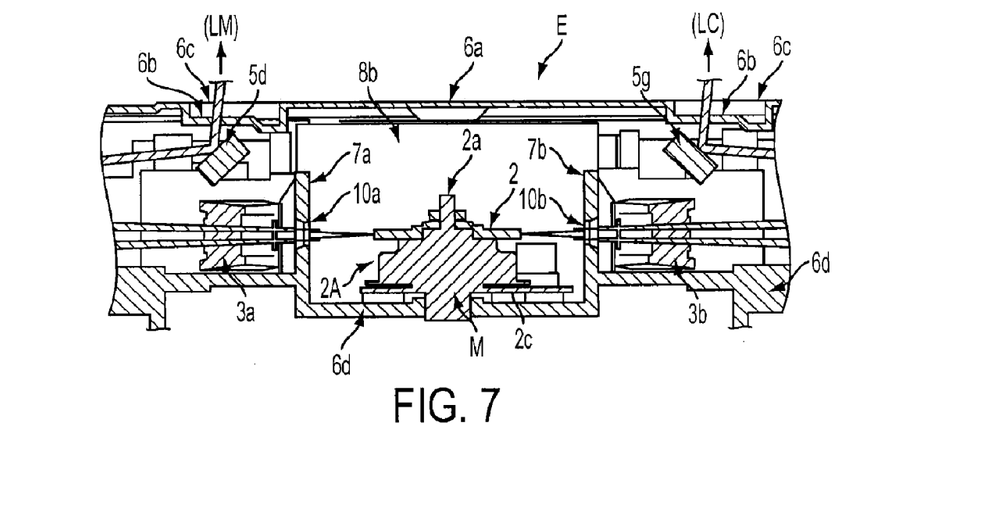
FIG. 7 is an enlarged sectional view taken along (7)-(7) line indicated in FIG. 6.

FIG. 3 is a perspective view of the optical system casing 6 from which the covering member 6a is removed to show the inside of the optical system casing 6, and FIG. 4 is a plan view of the optical system casing 6 from which the covering member 6a is removed to show the inside of the optical system casing 6. FIG. 5 is a partially enlarged view of a portion, at which a deflecting device is disposed, shown in FIG. 3. FIG. 6 is a partially enlarged view of a portion, at which a deflecting device is disposed, shown in FIG. 4. FIG. 7 is an enlarged sectional view taken along (7)-(7) line indicated in FIG. 6.

Figure 8:
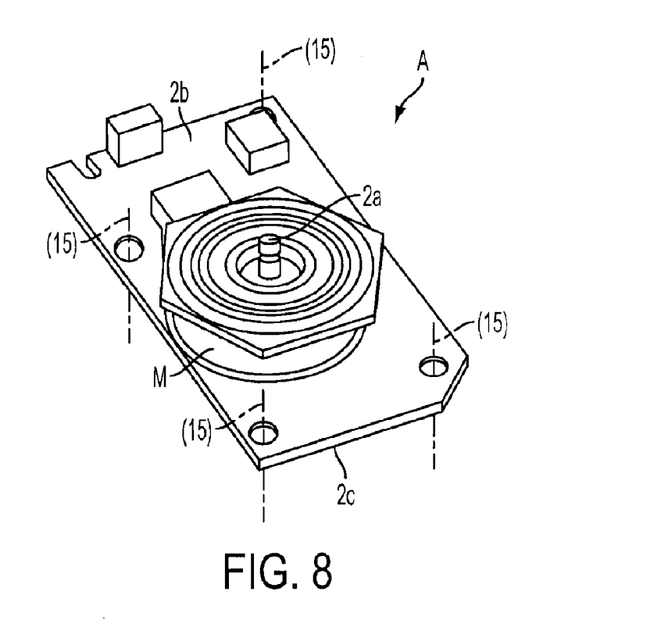
FIG. 8 is a perspective view of an outer appearance of a deflecting device.

At a substantially central portion of the bottom of the optical system casing 6, a deflecting device 2A is disposed. FIG. 8 is a perspective view of an outer appearance of the deflecting device 2A alone. The deflecting device 2A includes a base plate (seat) 2c and a motor (polygonal mirror motor) M held on the base plate 2c. Further, the deflecting device 2A includes a polygonal mirror (rotatable polygonal mirror) 2, which is fixed to an upward rotation shaft 2a of the motor M, as a deflecting element and includes a motor control circuit portion 2b which is provided on the base plate 2c and includes an integrated circuit (IC) and the like. The motor M is a driving device for rotationally driving the polygonal mirror 2 and, e.g., is a brushless DC motor. The deflecting device 2A is disposed, after the base plate 2c is positioned at a predetermined position of the substantially central portion at the bottom of the optical system casing 6, by being connected to a bottom plate 6d of the optical system casing 6 with screws 15.

The polygonal mirror 2 is rotated by the motor M in a counterclockwise direction indicated by an arrow in FIG. 6 at a high speed (generally in a range from about 20,000 rpm to about 40,000 rpm) in this embodiment.

The optical scanning apparatus E in this embodiment performs scanning exposure of a plurality of surfaces to be scanned (photosensitive drum surfaces at the first to fourth image forming stations) with a single polygonal mirror 2. For this purpose, on both sides of the polygonal mirror rotation shaft 2a (on a left-hand side and a right-hand side in FIGS. 2 and 4), first and second optical systems F and G each for forming an image of the light beam, on the surface to be scanned, used for the deflecting scanning by the polygonal mirror 2. Herein, the optical scanning apparatus of such a type is referred to as an "opposing type optical scanning apparatus" (an optical scanning apparatus having an opposing scanning system).

The first surface F and the second optical system G are bilateral (left-right) symmetrical optical systems. Each of the optical systems F and G includes the incident-side optical system (conversion optical system) and the emission-side optical system.

The incident-side optical system is an imaging optical system including an optical lens for forming an image of laser light (light beam), on the polygonal mirror 2, emitted from a semiconductor laser as the light source. This incident-side optical system is constituted by a compound lens having functions of a collimator lens (collimating lens) and a cylindrical lens for converging the laser light beam on the polygonal mirror in a long line shape with respect to the main scan direction.

The emission-side optical system is a scanning optical system including an optical lens for forming an image of the laser light, used for the deflection scanning by the polygonal mirror 2, on the photosensitive drum surface as the surface to be scanned and is specifically constituted by a lens for performing fθ correction and a folding mirror.

A laser unit 101a for the first optical system F (a first laser unit) includes a laser casing, a laser substrate, and first and second (two) semiconductor lasers 1a and 1b as the light source for emitting the light beam (laser light). These first and second semiconductor lasers 1a and 1b are disposed with an appropriate interval with respect to a vertical direction.

A laser unit 101b for the first optical system G (a second laser unit) includes a laser casing, a laser substrate, and third and fourth (two) semiconductor lasers 1c and 1d as the light source for emitting the light (laser light). These third and fourth semiconductor lasers 1c and 1d are also disposed with an appropriate interval with respect to the vertical direction.

The first and second laser units 101a and 101b are fixed to light source fixing portions 6g and 6h, respectively, with predetermined angles. That is, the first and second laser units 101a and 101b have oblique incident angles with respect to Z direction and are disposed so that the respective laser light beams intersect with each other on a deflected surface of the polygonal mirror 2.

The first semiconductor laser 1a is a light source for the first image forming station UY and emits laser light modulated correspondingly to an image signal of a color-separated Y component image for the full-color image. The second semiconductor laser 1b is a light source for the second image forming station UM and emits laser light modulated correspondingly to an image signal of a color-separated M component image for the full-color image.

The third semiconductor laser 1c is a light source for the third image forming station UC and emits laser light modulated correspondingly to an image signal of a color-separated C component image for the full-color image. The fourth semiconductor laser 1d is a light source for the fourth image forming station UK and emits laser light modulated correspondingly to an image signal of a color-separated K component image for the full-color image. That is, in the optical system casing in this embodiment, light sources are provided corresponding to respective colors and electrostatic latent images for respective colors and formable on associated photosensitive drums.

Figure 9:
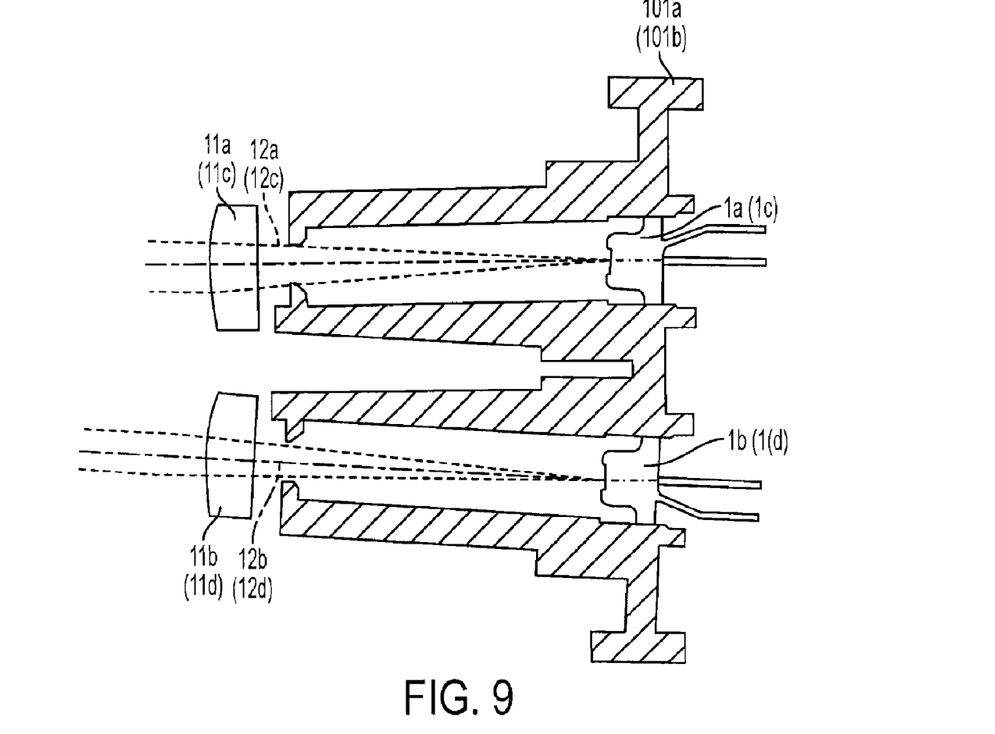
FIG. 9 is a sub-scanning sectional view of a laser unit.

FIG. 9 is a sub-scanning sectional view of the first laser unit 101a (or the second laser unit 101b). Collimator lenses 11a (11c) and 11b (11d) convert divergent light beams emitted from the semiconductor lasers 1a (1c) and 1b (1d) into substantially parallel light beams. Apertures (aperture stops) 12a (12c) and 12b (12d) shape the laser light beams emitted from the semiconductor lasers 1a (1c) and 1b (1d) into a desired optimum beam.

In this embodiment, the respective light beams optically modulated and emitted from the semiconductor lasers 1a (1c) and 1b (1d) are converted into the substantially parallel light beams. Then, the light beams are shaped into the desired beam. Thereafter, the light beams are incident on the cylindrical lens. Of the substantially parallel light beams having entered the cylindrical lens, those in the main scan cross section are emitted as they are. Further, those in the sub-scan cross section are converged to provide an image as a line image on a deflection surface of the polygonal mirror 2.

The above-described compound lens including the collimator lens and the cylindrical lens constitutes the incident-side optical system (conversion optical system) and causes the laser light (light beam) emitted from the semiconductor laser to provide an image on the polygonal mirror 2. The compound lens is adjusted and fixed at such a position that an irradiation position and a point of focus are ensured with respect to each of the laser light beams. The two laser light beams obliquely emitted from the first and second laser units 101a and 101b are converged with respect to the sub-scan direction by the above-described compound lens. As a result, a line image is formed at a single reflection point on the polygonal mirror 2 of the deflecting device 2A.

The light beams deflected and reflected at the deflection surface of the polygonal mirror 2 are converged to the photosensitive drum surface through associated emission-side optical systems for the light beams, so that the photosensitive drum surface is subjected to constant speed scanning with the light beams with respect to the main scan direction by rotation of the polygonal mirror 2. That is, the two laser light beams which are to be reflected by the reflection surface of the polygonal mirror and are to be subjected to the deflection scanning are obliquely reflected by the reflection surface with a vertically inverted relationship to travel toward imaging lenses 3a and 3b as fθ lenses of the emission-side optical systems.

Figure 10:
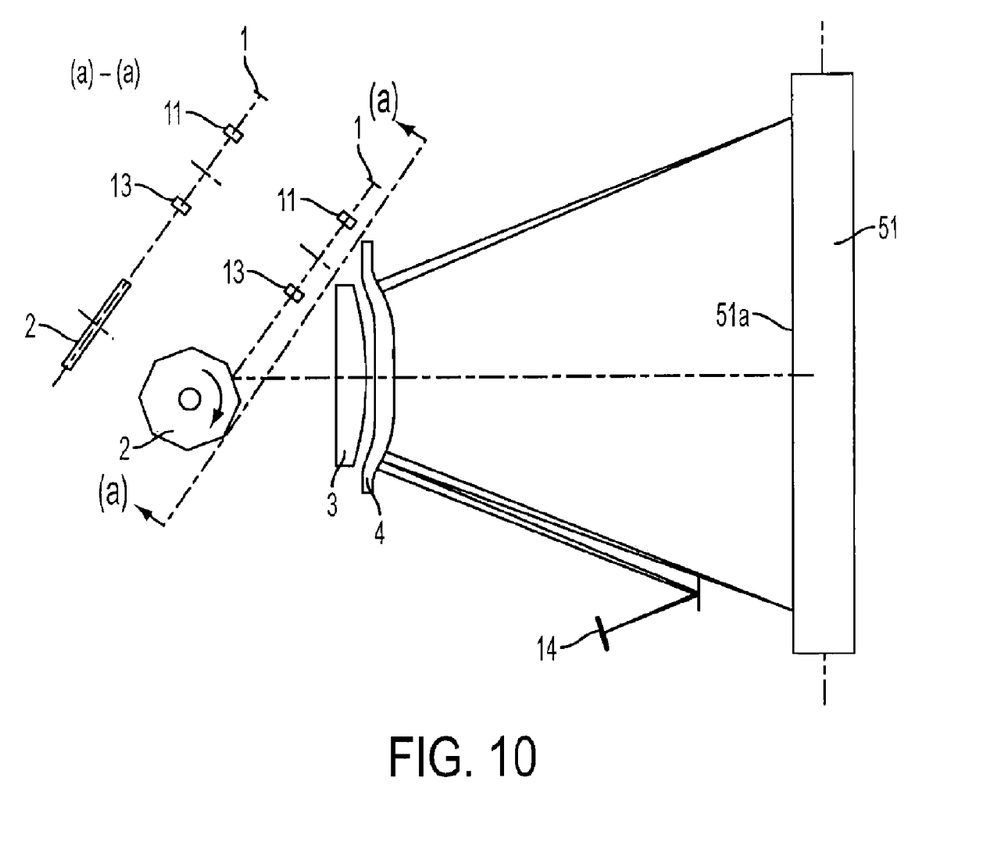
FIG. 10 is a development of an incident-side optical conversion system and an imaging optical system which include optical elements arranged from a single light source to a single surface to be scanned.

FIG. 10 is a development of the incident-side optical system and the emission-side optical system which include optical elements from a single light source 1 to a single surface to be scanned 51a. The folding mirror is omitted. The light emitted from the light source 1 passes through a collimator lens 11 and is converted into a parallel light beam. Thereafter, the parallel light beam passes through a cylindrical lens 13 and once provides an image on a surface of the polygonal mirror 2. Then, the light beam deflected by the polygonal mirror 2 passes through a first imaging lens (fθ lens) 3 and a second imaging lens (fθ lens) 4 and then provides an image at the surface 51a of the photosensitive drum 51 as a member to be scanned. By the first and second imaging lenses 3 and 4, fθ correction of the scanning light is performed. The image formation with respect to the sub-scan direction is principally performed by the second imaging lens 4. A reference numeral 14 represents a synchronism detecting element for determining writing timing of the light beam.

Specifically, laser scanning exposure with respect to the photosensitive drum surface at the first image forming station UY is carried out by the first optical system F along a path in the order of the first semiconductor laser 1a, the collimator lens 11, the cylindrical lens 13, a light guide path 113, the polygonal mirror 2, the first imaging lens 3a, the second imaging lens 4a, the folding mirror 5a, a slit window 6b, and a dustproof glass member 6c.

Laser scanning exposure with respect to the photosensitive drum surface at the second image forming station UM is carried out by the first optical system F along a path in the order of the second semiconductor laser 1b, the collimator lens 11, the cylindrical lens 13, a light guide path 113, the polygonal mirror 2, the folding mirror 5b, the folding mirror 5c, the second imaging lens 4b, the folding mirror 5d, a slit window 6b, and a dustproof glass member 6c.

Laser scanning exposure with respect to the photosensitive drum surface at the third image forming station UC is carried out by the second optical system G along a path in the order of the third semiconductor laser 1c, the collimator lens 11, the cylindrical lens 13, a light guide path 114, the polygonal mirror 2, the folding mirror 5e, the folding mirror 5f, the second imaging lens 4c, the folding mirror 5g, a slit window 6b, and a dustproof glass member 6c.

Laser scanning exposure with respect to the photosensitive drum surface at the fourth image forming station UK is carried out by the second optical system G along a path in the order of the fourth semiconductor laser 1d, the collimator lens 11, the cylindrical lens 13, a light guide path 114, the polygonal mirror 2, the first imaging lens 3b, the second imaging lens 4d, the folding mirror 5h, a slit window 6b, and a dustproof glass member 6c.

In the above paths, the first and second imaging lenses 3a, 3b, 4a and 4b are an fθ lens system. The second imaging lenses 4a and 4b are located closer to the surface to be scanned them the first imaging lenses 3a and 3b.

As shown in FIG. 6, first to fourth ribs 7a, 7b, 8a and 8b are disposed on an optical system casing bottom plate 6d, located outside an area in which the deflecting device 2A is projected onto the bottom of the optical system casing 6 (surface of projection), so as to surround the polygonal mirror 2. These ribs 7a, 7b, 8a and 8b are plate-like projection ribs, which have a function of ensuring rigidity of the entire optical system casing 6 and function as a flare preventing wall for narrowing flare light reflected by the imaging lens, and intersect with the bottom of the optical system casing 6.

The first rib 7a is located at a position between the polygonal mirror 2 and the first imaging lens 3a on the first optical system F side. The second rib 7b is located at a position between the polygonal mirror 2 and the first imaging lens 3b on the second optical system G side. These first and second ribs 7a and 7b are provided with holes (openings or frame-shaped portions) 10a and 10b for narrowing the flare light as shown in FIG. 7. The light beams deflected and reflected by the polygonal mirror 2 pass through these holes 10a and 10b to enter the first optical system F and the second optical system G. That is, only the light beams having passed through these holes 10a and 10b can reach the photosensitive drum surfaces.

By the presence of the ribs 7a and 7b provided with the holes 10a and 10b for narrowing the flare light, it is possible to prevent the flare light from the opposing scanning side with reliability.

A third rib 8a (first wall portion) is located at a position closer to the deflecting device 2a in optical light paths 113 and 114 between the deflecting device 2A and the first and second laser units 101a and 101b. This third ribs 8a is disposed substantially concentrically with the center shaft 2a of the polygonal mirror 2 as the deflecting element and is provided with light beam passing portions 9a and 9b as holes (restriction holes or openings) through which the laser light emitted from the first and second laser units 101a and 101b. That is, the third rib 8a which is part of the ribs surrounding the deflecting device 2A is disposed substantially concentrically with the center shaft 2a of the polygonal mirror 2 and at least the light beam passing portions 9a and 9b remove part of the rib 8a. The resultant opening (first opening) by the removal permits passing of the laser light from the laser unit toward the polygonal mirror 2. It is also possible to provide the opening with a function of limiting (narrowing) the laser light passing through the opening.

The optical system casing 6 includes a second wall portion 16 provided, on an opposite side from the polygonal mirror 2 side with respect to the first wall portion 8a, closely to the first wall portion 8a and connected to the first wall portion 8a so as to define a closed surface to provide a closed space S except for the light beam passing portions. The second wall portion 16 is provided with holes (openings) 17a and 17b through which the laser light (light beam) passes. It is also possible to provide the holes with a function of limiting (narrowing) the laser light passing through the holes.

In this embodiment, a connecting portion (connecting wall portion) 20 which connects the first wall portion 8a and the second wall portion 16 is provided. The closed space S is defined by the first wall portion 8a, the second wall portion 16, the connecting portion 20, the optical system casing bottom plate 6d, and the covering member 6a. The first wall portion 8a, the second wall portion 16 and the connecting portion 20 stands from the bottom plate 6d and have such a height that these portions contact the covering member 6a when the covering member 6a is provided. For that reason, the optical system casing is covered with the covering member 6a to provide the closed space S.

The first wall portion 8a and the second wall portion 16 are provided in order to limit movement of the air flow from the deflecting device 2A toward the light sources. That is, the first wall portion 8a and the second wall portion 16 are disposed in the incident-side optical system.

In the first optical system F, the laser light emitted from each of the first and second semiconductor lasers 1a and 1b of the first laser unit 101a is incident on the polygonal mirror 2 along a path in the order of the collimator lens 11, the cylindrical lens 13, the optical light path 113, the hole 17a of the second wall portion 16, and the hole 7a of the first wall portion 8a.

In the second optical system G, the laser light emitted from each of the third and fourth semiconductor lasers 1c and 1d of the second laser unit 101b is incident on the polygonal mirror 2 along a path in the order of the collimator lens 11, the cylindrical lens 13, the optical light path 114, the hole 17b of the second wall portion 16, and the hole 7b of the first wall portion 8a.

As described above, the polygonal mirror 2 as the deflecting element of the deflecting device 1A rotates at high speed, so that relatively high-speed air flow is generated around the polygonal mirror 2.

In the optical scanning apparatus E for the tandem-type color image forming apparatus as in this embodiment, many optical parts are required to be accommodated three-dimensionally in the optical system casing. Further, it is necessary to take measure against interference of flare or the like of the plurality of laser light beams. For that reason, a space around the polygonal mirror is relatively narrowed and closed.

The air warmed by self-heat-generation of the deflecting device 2A flows out of a deflecting device accommodating portion as the above-described air flow. However, the optical system casing itself has an enclosed structure from the viewpoint of dust-proofness, so that the air flow is basically circulating flow within the optical system casing.

In this embodiment, as described above, in the optical paths directed from the laser light sources 101a and 101b toward the deflecting device 2A, the wall portion (first wall portion) 8a having an arc-like curved surface with the center shaft 2a of the polygonal mirror 2 as a center. The first wall portion 8a is provided with the first openings obtained by removing part of the wall surface so as to permit passing of the laser beam. In the neighborhood of the first wall portion 8a, the second wall portion 16 for forming the closed space S except for the laser beam passing portions by being connected to the first wall portion 8a is provided. The second wall portion 16 is provided with the second openings obtained by removing part of the wall surface so as to permit the laser beam passing. The closed space S is provided by the closed surface, except for the first and second openings, defined by the first wall portion 8a, the second wall portion 16, and the connecting portion 20.

Figure 11:
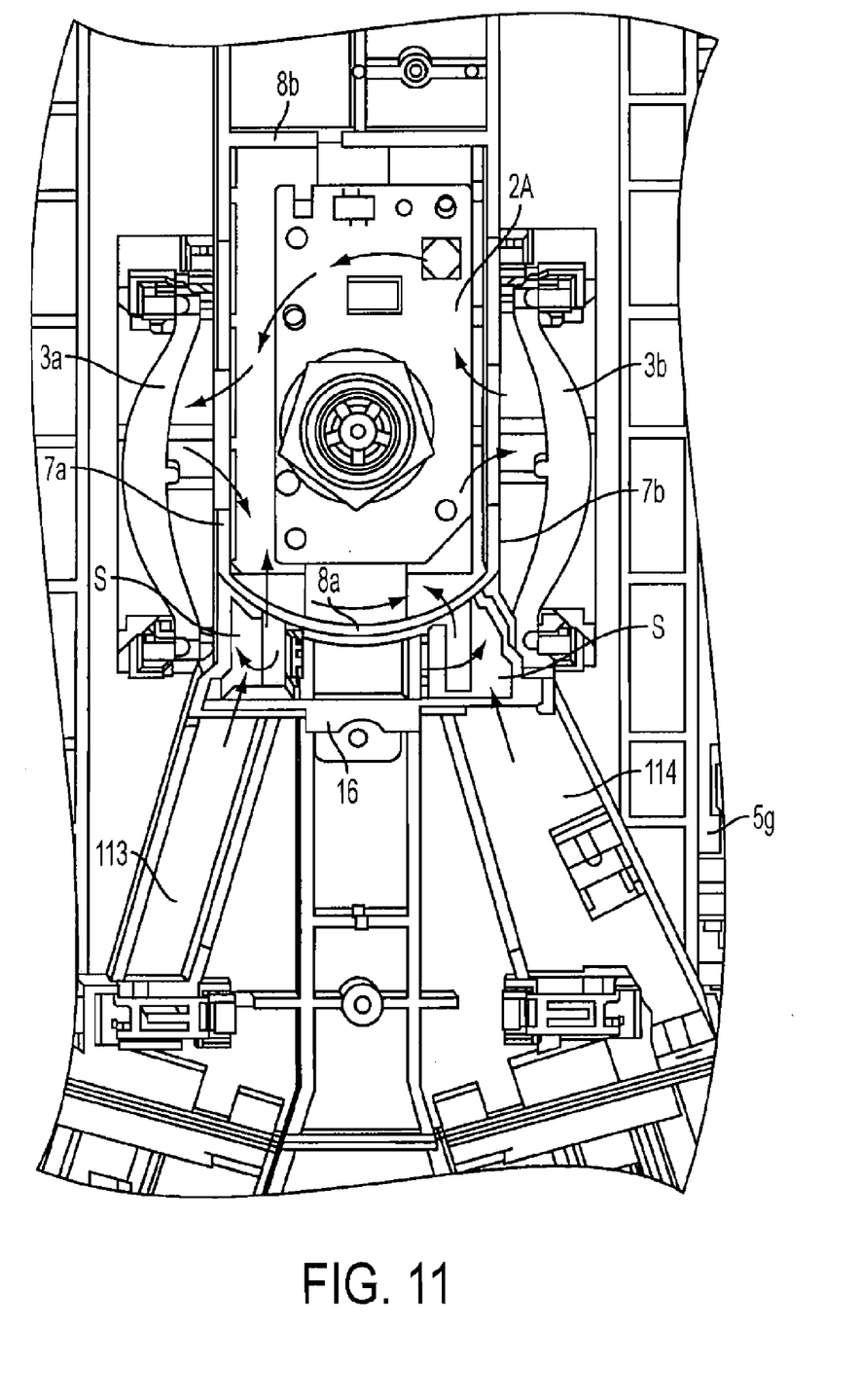
FIG. 11 is a schematic plan view for simply illustrating air flow within an optical system casing of an optical scanning apparatus in Embodiment 1.

FIG. 11 is a schematic plan view for simply illustrating the air flow within the optical system casing in the constitution of this embodiment. That is, the optical system casing shown in FIG. 11, as in this embodiment, constituted by providing the closed space S in the light guide paths 113 and 114 extending from the first and second laser units as the light source to the polygonal mirror 2.

Figure 12:
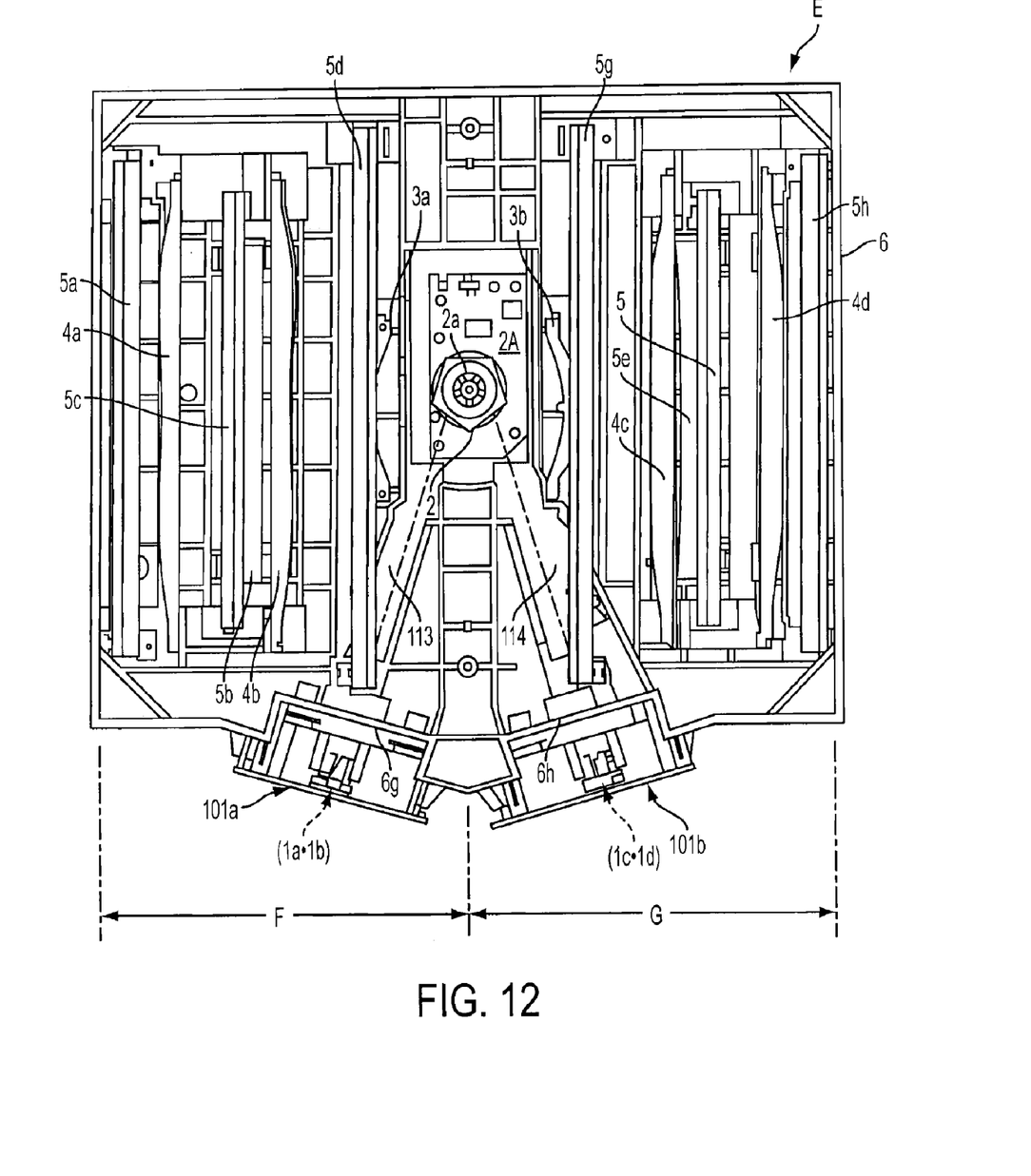
FIG. 12 is a plan view an optical system casing, having a constitution in which a first wall portion and a second wall portion are not provided, as a comparative embodiment.
Figure 13:
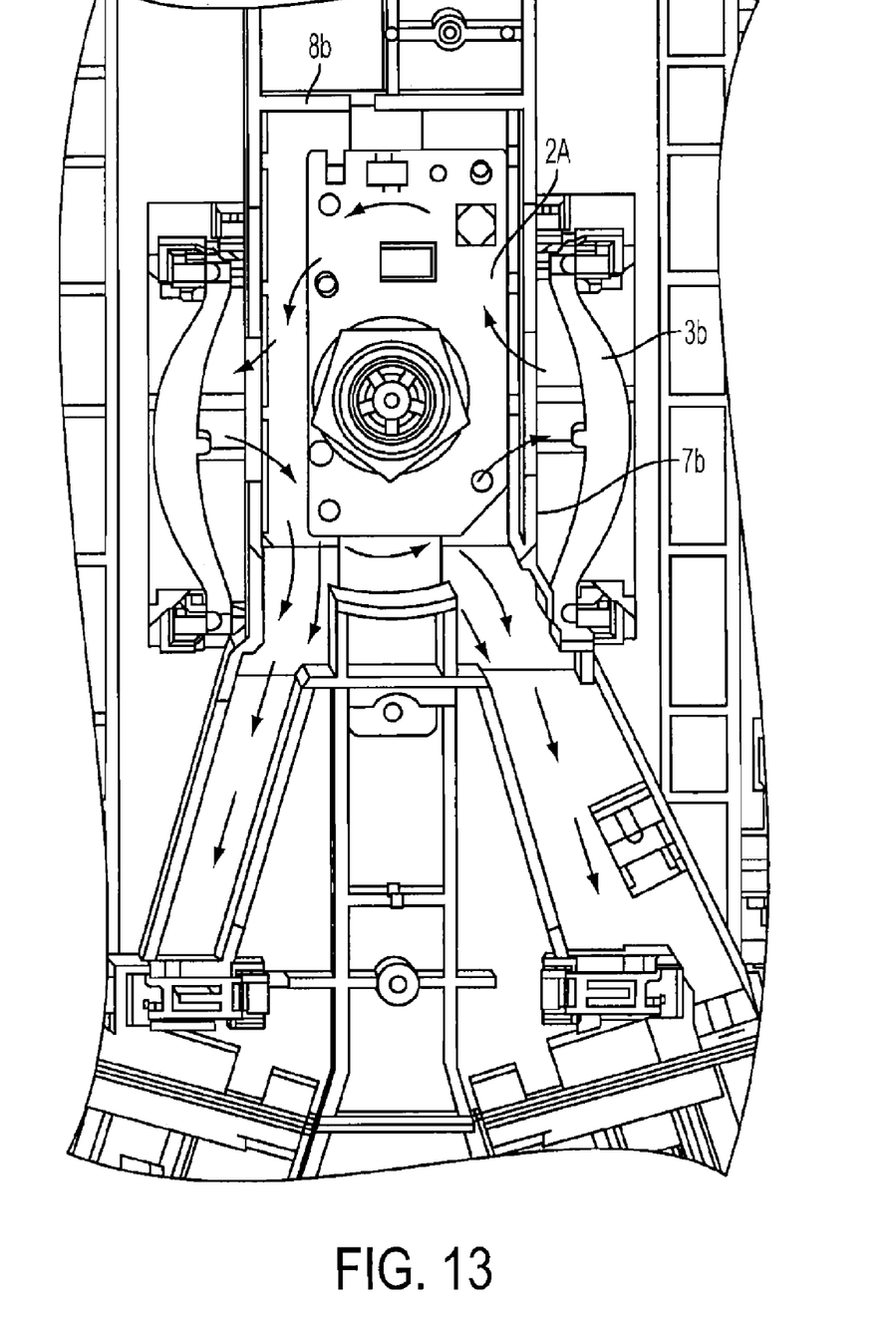
FIG. 13 is a schematic plan vie for simply illustrating air flow within the optical system casing shown in FIG. 12.

FIG. 12 is a schematic plan view of an optical system casing, having a constitution in which the closed space S as provided in this embodiment is not provided, as a comparative embodiment. FIG. 13 is a schematic plan view for simply illustrating the air flow within the optical system casing shown in FIG. 12.

In FIG. 13, the polygonal mirror 2 of the deflecting device 2A rotates in a counterclockwise direction, so that the behavior of the airflow is different between the light guide path 113 side and the light guide path 114 side. On the light guide path 114 side, both of air intake and air exhaust are carried out at a boundary portion of the accommodating portion of the deflecting device 2A and it can be confirmed that the air flows in whirl at the boundary portion. On the light guide path 113 side, it can be confirmed that strong air flow by the air exhaust reaches the neighborhood of the light source as it is.

On the other hand, in Embodiment 1, as shown in FIG. 11, the air flow on the polygonal mirror 2 side is prevented from moving toward the light source side by the closed space S provided by the first wall portion 8a, the second wall portion 16, and the connecting portion 20 which are provided on the light guide path 113 side. Similarly, by the closed space S provided on the light guide path 114 side, the air flow on the polygonal mirror 2 side is prevented from moving toward the light source side.

The above-described air flow state in the optical system casing provided with the closed space S has been confirmed in an experiment but the reason therefor is presumed as follows.

As described above, the polygonal mirror 2 of the deflecting device 2A rotates at high speed. For this reason, the air around the polygonal mirror 2 is drawn by the polygonal mirror 2 due to its viscosity, so that air flow moving apart from the polygonal mirror 2 is generated in a plane perpendicular to the rotation shaft of the polygonal mirror 2. This air flow principally moves in a tangential direction of the polygonal mirror. As in this embodiment, when the wall located at the position facing the polygonal mirror 2 has a shape along the air flow generated by the rotation of the polygonal mirror 2 (e.g., an arcuate wall surface with the rotation shaft of the polygonal mirror 2 as a center of arcuation), a speed of the air flow is not lowered in the neighborhood of the first wall portion 8a. For that reason, by Bernoulli's theorem, an atmospheric pressure in the neighborhood of the first wall portion is lower than that when the rotation of the polygonal mirror 2 is stopped. At the wall surface of the first wall portion 8a, the first openings 9a and 9b are provided, so that the air flows from the closed space S into a low pressure portion on the polygonal mirror 2 side. As a result, the back surface side (light source side) of the first wall portion 8a is placed in a low pressure state.

Here, a problem occurring in a constitution in which the connecting wall portion 20 is opened, i.e., a constitution in which the air flow directed from the polygonal mirror 2 toward the light source side is blocked by the first wall portion 8a and the second wall portion 16 will be described.

In the constitution in which the connecting wall portion 20 is opened, an area between the first wall portion 8a and the second wall portion 16 is taken as an area S' (corresponding to the closed space S). When the rotation of the polygonal mirror 2 starts, with the first wall portion 8a as a boundary, the atmospheric pressure on the polygonal mirror 2 side is lowered more than that on the light source side. For that reason, the air directed from the light source side toward the polygonal mirror 2 side passes through the first opening 9a. As a result, the atmospheric pressure in the neighborhood of the first opening 9a in the area S' is lowered relative to the ambient atmospheric pressure.

In the area S', when the low atmospheric pressure portion (low pressure portion) as described above is generated, the air flow directed toward the low pressure portion along the first wall portion 8a and the second wall portion 16 occurs. For that reason, the atmospheric pressure in the area S' is higher than that on the light source side with the second wall portion as a boundary. Further, this air flow receives heat from the first wall portion 8a which has received heated air by the rotation of the polygonal mirror 2, so that the air flow directed toward the low pressure portion along the first wall portion 8a and the second wall portion 16 flows into the area S' to increase the temperature in the area S'. For that reason, high-temperature air flows toward the light source side, so that there is a possibility of an occurrence of deformation of the light source and the supporting member for supporting the light source.

In view of this problem, by providing the connecting wall portion 2 to provide the closed space S, the air flow in the closed space S along the first wall portion 8a and the second wall portion 16 does not occur. As a result, with the second wall portion 16 as the boundary, the pressure in the closed space S is lower than that on the light source side, so that the air flows from the light source side of the second wall portion 16 into the closed space S. For that reason, the air flow from the light source side toward the polygonal mirror 2 side is established.

In this embodiment, the first wall portion 8a is formed in a curved surface shape, so that the air flow generated during the polygonal mirror rotation moves along the first wall portion 8a. By the curved surface shape, turbulent flow is less liable to occur, so that it is possible to stabilize the rotation of the polygonal mirror 2. However, by the curved surface shape, the air flow is slidable to move, so that a speed of the air flow is increased. For this reason, the polygonal mirror 2 side of the first wall portion 8a is liable to be placed in a negative-pressure state.

As described above, the closed space S constituted by the first wall portion 8a and the second wall portion 16 is provided between the deflecting device 2A and the light sources 101a and 101b. As a result, the laser beams from the light sources 101a and 101b can reach the deflecting device 2A with no physical obstruction while the warm air flow directed from the deflecting device 2A side toward the light source 101a and 101b sides can be blocked. For that reason, it is possible to suppress the deformation of the light source and the supporting member for supporting the light source.

Particularly, in the case where the image formation is started when the polygonal mirror 2 is stopped in a temperature-increased state of the deflecting device 2A, the air flow generated by the rotation of the polygonal mirror 2 is high in temperature from an initial stage of the rotation. For that reason, even immediately after the rotation, the air flow passing through the holes 9a, 9b, 17a and 17b can deform the light source and the light source supporting member. On the other hand, when the optical scanning apparatus provided with the closed space S is used, at the initial stage of the rotation of the polygonal mirror 2, it is possible to suppress the passing of the air flow through the holes 9a, 9b, 17a and 17b.

Embodiment 2

Figure 14:
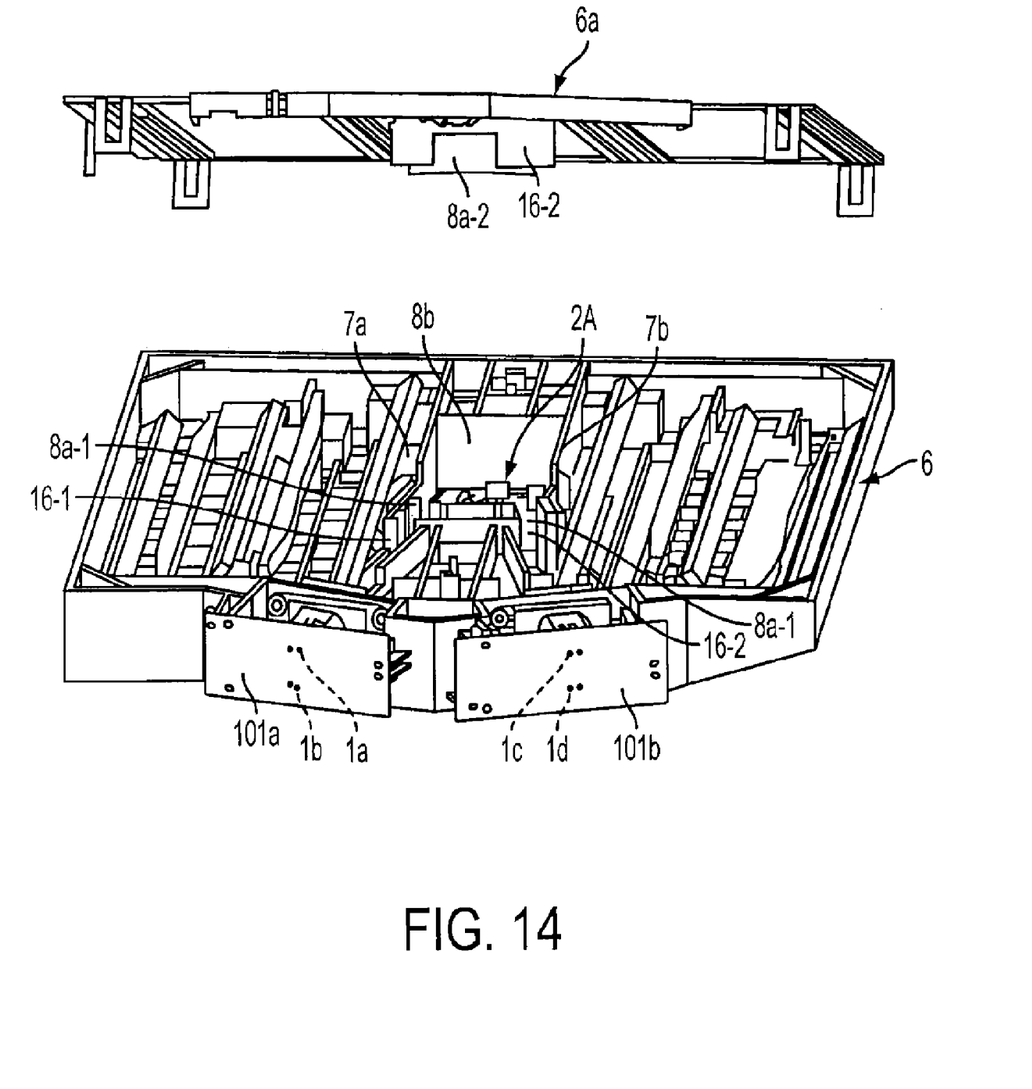
FIG. 14 is a schematic view for illustrating an optical scanning apparatus in Embodiment 2.

FIG. 14 is a schematic view for illustrating an optical scanning apparatus in Embodiment 2. Basic constitutions and functions of the optical scanning apparatus are common to those of the optical scanning apparatus in Embodiment 1, thus being omitted from redundant description.

In this embodiment, the first wall portion 8a and the second wall portion 16 which are integrally formed separately inside the optical system casing 6 are formed by a combination of the optical system casing 6 and the covering member 6a.

A U-shaped first wall portion 8a-1 is formed on the optical system casing 6 side and is combined with a rib 8a-2 formed on the covering member 6a side to constitute the first wall portion 8a provided with holes (first openings) 9a and 9b. Similarly, a U-shaped second wall portion 16-1 is formed on the optical system casing 6 side and is combined with a rib 16-2 formed on the covering member 6a side to constitute the second wall portion 16 provided with holes (second openings) 17a and 17b.

In the constitution of this embodiment, a slide structure of the mold for molding the optical system casing is not required for forming the shapes of the first openings 9a and 9b and the second openings 17a and 17b.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 041456/2008 filed Feb. 22, 2008, which is hereby incorporated by reference.

What is claimed is:

1. An optical scanning apparatus comprising:
   a light source for emitting a light beam;
   a deflecting device comprising a deflecting element for deflecting the light beam, from said light source, to a surface to be scanned and comprising a motor for driving the deflecting element;
   an optical system casing for accommodating said light source and said deflecting device;
   a first wall portion, provided between said light source and said deflecting device to face said deflecting device, having a first opening for permitting passing of the light beam from said light source toward said deflecting device;
   a second wall portion, provided between said first wall portion and said light source, having a second opening for permitting passing of the light beam from said light source toward said deflecting device; and
   a connecting portion for connecting said first wall portion and said second wall portion,
   wherein said first wall portion, said second wall portion, and said connecting portion define a closed surface except for the first opening and the second opening.

2. An apparatus according to claim 1, wherein said first wall portion is disposed concentrically with a center axis of said deflecting device.

3. An apparatus according to claim 1, wherein said optical scanning apparatus further comprises a covering member for covering an open surface of said optical system casing, and
   wherein the first opening and the second opening are formed by a combination of said optical system casing and said covering member.

4. An apparatus according to claim 1, wherein the surface to be scanned is scanned with the light beam from said light source so that electrostatic latent images to be developed as toner images of different colors are formable on the surface, and
   wherein said light source comprises a plurality of light source portions for forming the electrostatic latent images for the respective colors.

5. An apparatus according to claim 1, wherein at least one of the first opening and the second opening has a function as an aperture stop for limiting passing of the light beam emitted from said light source.

* * * * *